United States Patent
Collings

(10) Patent No.: US 7,103,287 B2
(45) Date of Patent: Sep. 5, 2006

(54) METHOD FOR REMODULATING AN OPTICAL STREAM WITH INDEPENDENT DATA

(75) Inventor: Brandon C. Collings, Middletown, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 623 days.

(21) Appl. No.: 09/793,222

(22) Filed: Feb. 26, 2001

(65) Prior Publication Data

US 2002/0118423 A1  Aug. 29, 2002

(51) Int. Cl.
*H04B 10/12* (2006.01)

(52) U.S. Cl. .......................... 398/201; 398/90; 398/176

(58) Field of Classification Search ................ 398/140, 398/170, 175, 176, 90, 76, 168, 169, 201
See application file for complete search history.

(56) References Cited

U.S. PATENT DOCUMENTS

| | | | | |
|---|---|---|---|---|
| 4,451,827 A | * | 5/1984 | Kahn et al. | 340/825.52 |
| 5,751,455 A | * | 5/1998 | Shibutani et al. | 398/76 |
| 5,815,295 A | * | 9/1998 | Darcie et al. | 398/72 |
| 6,359,951 B1 | * | 3/2002 | Morriss et al. | 375/377 |

* cited by examiner

*Primary Examiner*—Christina Y. Leung

(57) ABSTRACT

A method and apparatus for remodulating an optical data stream such that a second modulated data stream is optically transported along with a first modulated data stream. In one embodiment, an optical signal having modulated thereon a first data stream is split into a plurality of reduced power optical signals, wherein at least one of the reduced power optical signals is remodulated to additionally include a second data stream. The first data stream is preferably Manchester encoded, the data rate of the second data stream is preferably one half the data rate of the first data stream.

8 Claims, 7 Drawing Sheets

METHOD FOR REMODULATING AN OPTICAL STREAM WITH INDEPENDENT DATA

TECHNICAL FIELD

The invention relates to the field of communication systems and, more specifically, to a method and apparatus for remodulating an optical data stream with independent data.

BACKGROUND OF THE INVENTION

Optical distribution networks are well known. Within such networks, an optical source such as a laser produces energy which is in turn modulated according to a data source to produce a modulated light stream suitable for distribution via an optical medium. A receiver accepts and demodulates the light stream to recover the modulated data. If additional data is to be sent from a location proximate the receiver, light produced by a new light source proximate the receiver is modulated according to the additional data.

It is seen to be desirable to provide for the optical transmission of such additional data without the use of a second light source.

It is seen to be desirable to provide for the transmission of the second modulated light stream without the use of a second light source.

SUMMARY OF THE INVENTION

The invention comprises a method and apparatus for remodulating an optical data stream such that a second modulated data stream is transported along with a first modulated data stream in a single optical signal.

A method according to the invention comprises the steps of splitting, into a plurality of reduced power optical signals, an optical signal having modulated thereon a first data stream, the first data stream having associated with it a first data rate; and modulating at least one of the reduced power optical signals according to a second data stream, the second data stream having associated with it a second data rate, the second data rate being less than the first data rate.

BRIEF DESCRIPTION OF THE DRAWINGS

The teachings of the present invention can be readily understood by considering the following detailed description in conjunction with the accompanying drawing in which.

To facilitate understanding, identical reference numerals have been used, where possible, to designate identical elements that are common to the figures.

DETAILED DESCRIPTION OF THE PREFERRED EMBODIMENT

The invention will be described within the context of an optical distribution system where an optical source such as a laser produces a light signal which is subsequently processed by various processing elements such as modulators, power taps and receivers/demodulators. While the invention is primarily described within the context of signal mode optical processing, it will be appreciated by those skilled in the art that an optical channel such as described below may comprise a single mode fiber channel, a multiple mode fiber channel, a channel within a wavelength division multiplexing (WDM) system or any other optical channel or transmission medium. Further, while modulation/demodulation techniques described below find particular application within the present invention, it will be appreciated by those skilled in the art that other modulation/demodulation techniques may also be used within the concept of the present invention. It is important to understand that the specific modulation technique selected is not critical to the operation of the present invention, though some modulation techniques are more appropriate due to their efficacy within the context of optical processing.

Figure 1:
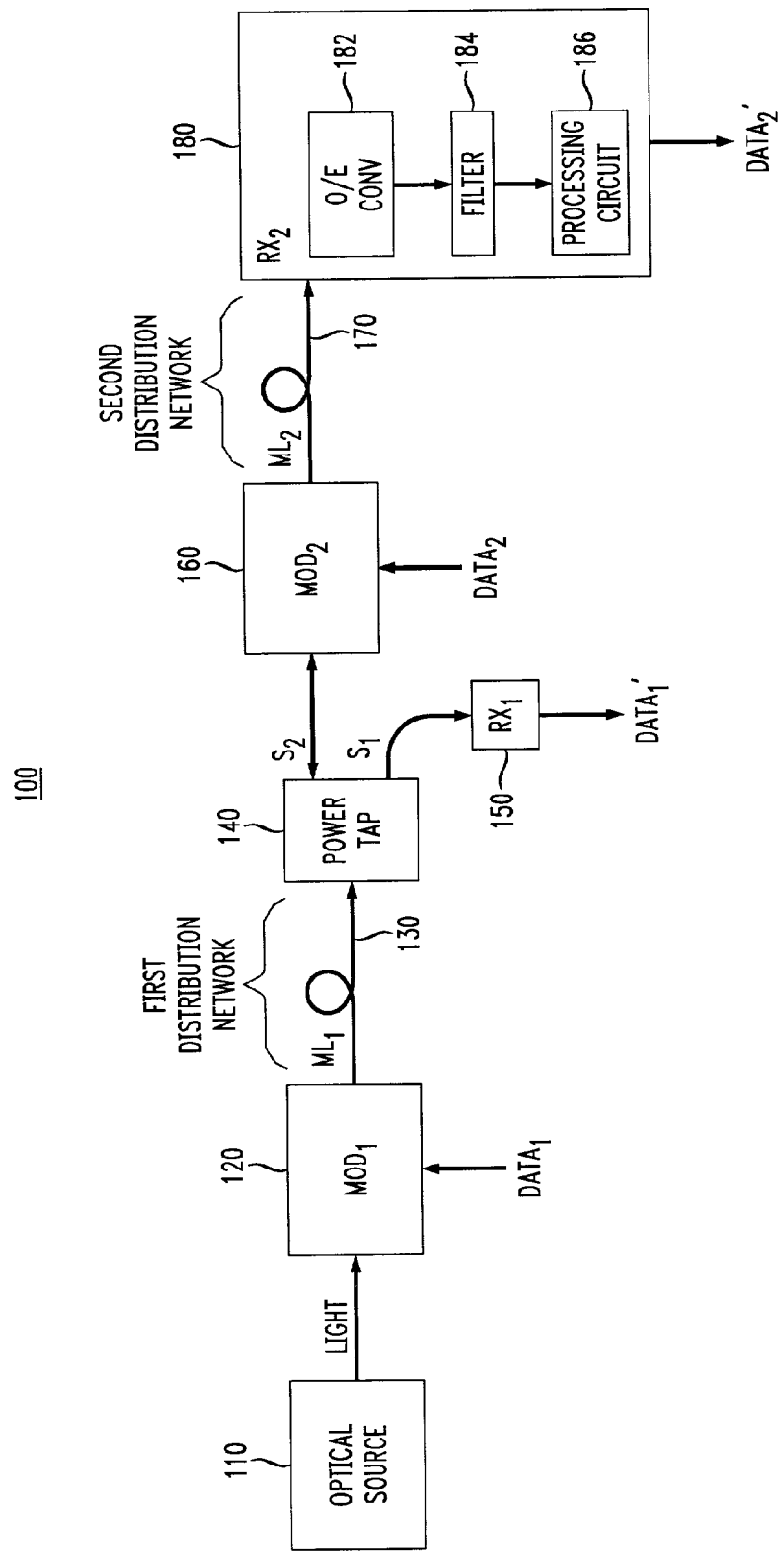
FIG. 1 depicts a high level block diagram of a system benefiting from the present invention.

FIG. 1 depicts a high level block diagram of a system benefiting from the present invention. Specifically, FIG. 1 depicts a high level block diagram of a data transmission system 100 comprising an optical source 110, a first modulator 120, a first optical distribution network 130, a power tap 140, a first receiver 150, a second modulator 160, a second optical distribution network 170 and a second receiver 180.

The optical source 110 comprises a known optical source such as a continuous wave (CW) laser pulsed at a data rate equal to or greater than the data rate of a first data signal $DATA_1$. The optical source 110 may also comprise a CW incoherent light source. The optical source 110 produces an output signal LIGHT that is coupled to an input of the first modulator 120.

The first modulator 120 modulates the first data signal $DATA_1$ onto the optical signal LIGHT produced by the optical source 110 using, preferably, an intensity modulation technique. A modulated light signal $ML_1$ produced by the first modulator 120 is propagated through the first distribution network 130 to the power tap 140. In the embodiment of FIG. 1, the first distribution network 130 comprises a length of optical fiber, though other optical distribution means may be used.

The power tap 140 operates to split the modulated light signal $ML_1$ into a plurality of reduced power optical signals, illustratively two reduced power optical signals denoted as S1 and S2. First reduced power optical signal S1 is coupled to first optical receiver 150, which operates in a known manner to demodulate and otherwise recover the first data signal $DATA_1'$. Second reduced power optical signal $S_2$ is coupled to second modulator 160.

The second modulator 160 operates to modulate a second data stream $DATA_2$ onto the reduced power optical signal S2 using, preferably, an intensity modulation technique. A modulated light signal $ML_2$ produced by the second modulator 160 comprises an optical signal including modulated first data $DATA_1$ and modulated second data $DATA_2$ signals. The output $ML_2$ of the first modulator 160 is coupled to the second receiver 180 via the second distribution network 170. The second distribution network 170 comprises a length of optical fiber (though other optical transmission or coupling means may be employed).

The second receiver 180 operates to demodulate and otherwise recover the second data signal $DATA_2'$. In a preferred embodiment, the second receiver 180 comprises an optical-to-electrical (O/E) converter 182, a filter 184 and a processing circuit 186. The O/E converter 182 converts the received optical signal (i.e., $ML_2$) into an electrical signal that is provided to the filter 184. The filter 184 comprises, for example, a low pass filter having a passband adapted to pass the frequencies associated with the modulated second data $DATA_2$ signal and discriminate against the frequencies associated with the modulated first data $DATA_1$ signal. It is noted that the filter 184 may also comprise a bandpass filter passing a spectral region associated with a desired modulated data signal, such as the first $DATA_1$ or second $DATA_2$ signals. The processing circuit 186 processes the filtered electrical signals to extract, in a known manner, the desired data signal $DATA_1'$ and/or $DATA_2'$.

In the preferred embodiment, the first data signal $DATA_1$ is encoded using an encoding technique tending to limit the length of consecutive "mark" or "space" bits to a predefined length. In one embodiment, the known 8B/10B encoding technique (or any of the related variations known to those skilled in the art) may be used. In the 8B/10B encoding embodiment, 8 bits are encoded as 10 bits with a predictable number of "marks" and "spaces" within the 10 bit code. For example, in one embodiment 4, 5 or 6 marks are caused to occur with the remaining slots comprising spaces. Manchester coding is preferably utilized to achieve this result. "Mark" bits are encoded as a rising transition and "space" bits are encoded as a falling transition (or vice versa). In this embodiment, a high or low intensity level is limited to only one bit length. Additionally, in each bit slot there is a predictable and non-zero amount of optical energy.

The data rate of the second data signal $DATA_2$ is lower than the data rate of the first data signal $DATA_1$. The extent to which the data rate of the second data signal $DATA_2$ is lower depends upon the desired performance of the system carrying the second data signal $DATA_2$. That is, since the first data signal $DATA_1$ is still modulated upon the reduced power optical signal processed by the second modulator 160, second distribution network 170 and second receiver 180, the greater the difference between the data rates of the first and second data signals, the greater the likelihood of the second receiver 180 to discern the second data signal from the first data signal.

In a preferred embodiment, where the first data signal $DATA_1$ is Manchester encoded, the data rate of the second data signal $DATA_2$ may be as high as approximately one half of the rate of the first data signal $DATA_1$. This 2:1 ratio between the first and second data signal data rates tends to insure that a non-zero amount of optical energy will be present within each bit slot processed by the second modulator 160, assuming that the second modulator 160 utilizes an intensity encoding scheme.

For practical (i.e., non-ideal) systems, the energy in the bit slots may vary with the relative phase alignments of the two modulated data signals $DATA_1$ and $DATA_2$. However, as the data rate of the second data signal $DATA2$ becomes much less than half the data rate of the first data signal $DATA_1$, these variations due to relative timing and bit patterns are increasingly diminished.

Similar tradeoffs exist with respect to the encoding techniques utilized by the first modulator 120 to modulate the first data signal $DATA_1$. Specifically, encoding techniques which do not guarantee a fixed optical average power or energy per bit slot generated by the second modulator 160 for the second data signal $DATA_2$ (e.g., 4B/5B encoding) will result in average energy variations in the bit slots defined by the second modulator 160. For example, in the case of 4B/5B encoding utilized by the first modulator 120, a 1:4 average energy variation in the bit slots defined by the second modulator 160 may result.

Figure 2:
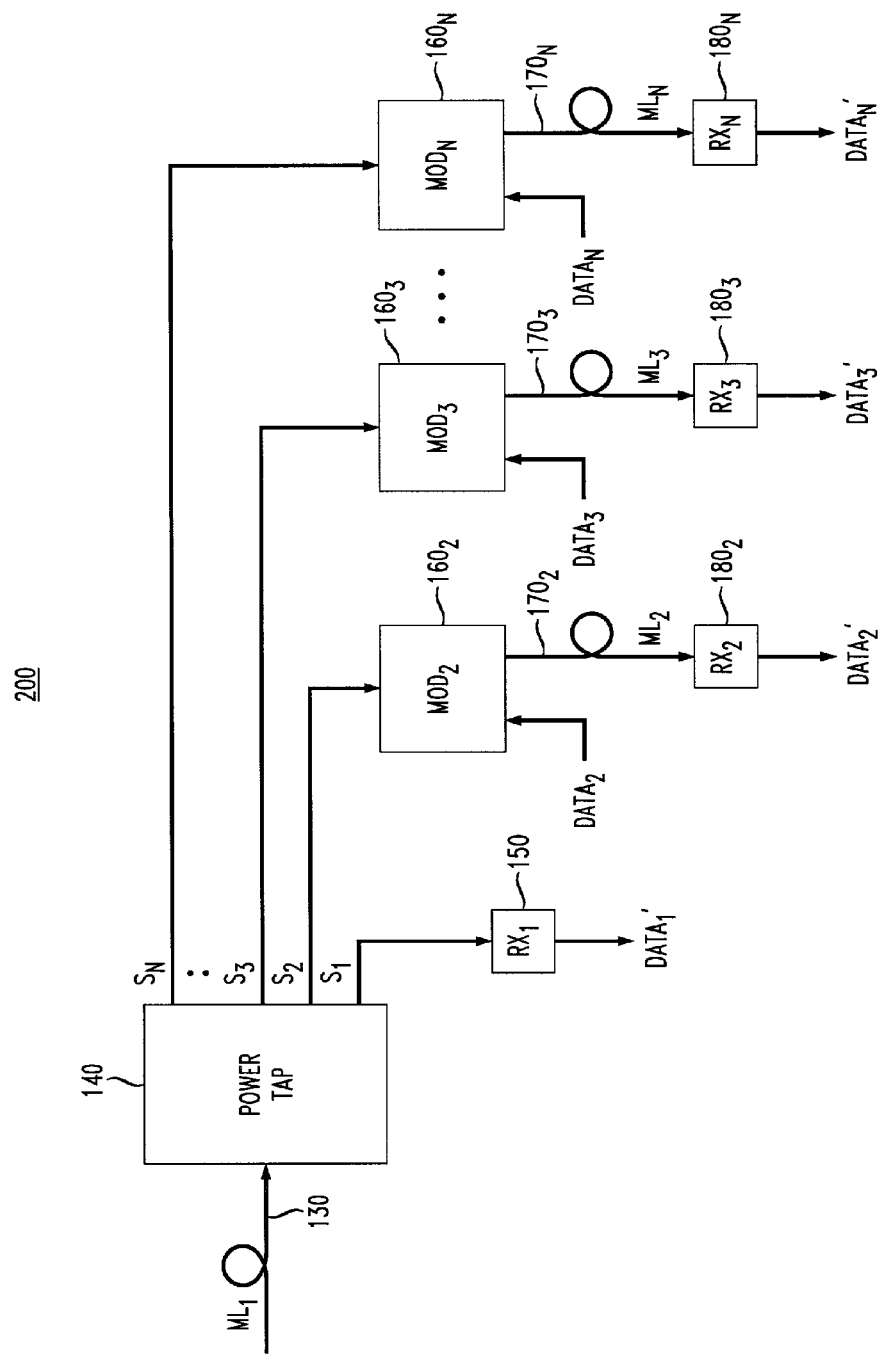
FIG. 2 depicts a high level block diagram of an apparatus according to an embodiment of the invention.

FIG. 2 depicts a high level block diagram of an apparatus according to an embodiment of the invention. Specifically, the apparatus 200 of FIG. 2 is adapted to process the first modulated light signal ML received via the first distribution network 130 and responsively produce therefrom a plurality of reduced power modulated light signals $ML_2$ through $ML_N$.

The first modulated light signal ML provided by first distribution network 130 is coupled to a power tap 140 which responsively provides a plurality of reduced power optical signals $S_1$ through $S_N$. As previously discussed with respect to FIG. 2, each of the reduced power optical signals $S_1$ through $S_N$ have modulated thereon the first data stream $DATA_1$.

An optical first receiver 150 extracts from the first reduced power optical signal S1 the first data stream $DATA_1'$. Each of the second $S_2$ and Nth $S_N$ reduced power optical signals is coupled to an input of a respective modulator $160_2$ through $160_N$ (collectively modulators 160). Each of the modulators $160_2$ through $160_N$ modulates a respective data stream $DATA_2$ through $DATA_N$ onto a respective one of the reduced power optical signals ($S_1$ through $S_N$) provided by power tap 140. The output of the modulators $160_2$ through $160_N$ is optically coupled, via respective optical distribution networks $170_2$ through $170_N$, to respective receivers $180_2$ through $180_N$. Each of the receivers $180_2$ through $180_N$ recovers a respective data signal $DATA_2'$ through $DATA_{N+1}'$.

The apparatus 200 of FIG. 2 operate to harness the power of a received optical signal ML to provide energy for a plurality of optical sources $S_1$ through $S_N$ (via power tap 140), which sources are remodulated according to respective independent data streams. As will be appreciated, the number of sources $S_1$ through $S_N$ to be provided from the received optical signal $ML_1$ is limited to the power of the received optical signal ML, and the power required to propagate the remodulated optical signals $ML_2$ through $ML_N$.

Each of the receivers $RX_2$ through $RX_N$ ($180_2$ through $180_N$) include respective filters, such as previously described with respect to the second receiver $RX_2$ 180 of the system 100 of FIG. 1. The filters within the receivers $180_2$ through $180_N$ are adapted to pass at least those frequencies used to modulate, respectively, data signals $DATA_2$ through $DATA_N$. As previously noted, bandpass and/or multiple filters may be used.

Figure 3:
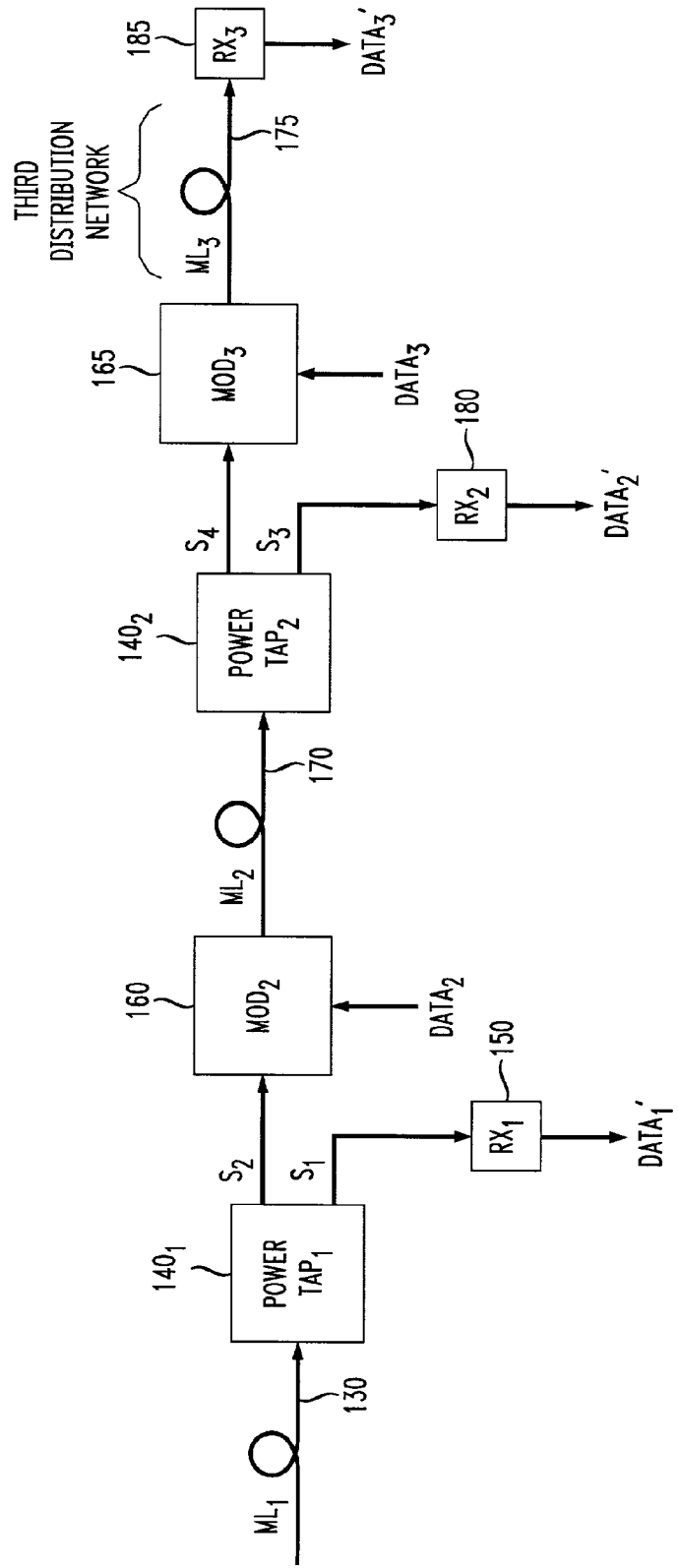
FIG. 3 depicts a high level block diagram of an apparatus according to an embodiment of the invention.

FIG. 3 depicts the high level block diagram of an apparatus according to an embodiment of the invention. Specifically, the apparatus 300 of FIG. 3 is adapted to process the first modulated light signal $ML_1$ received via the first distribution network 130 and responsively produces therefrom a plurality of reduced power modulated light signals $ML_2$ and $ML_3$. While the apparatus 200 of FIG. 2 operated in a parallel mode, the apparatus 300 of FIG. 3 operates in a cascade mode.

The apparatus of FIG. 3 comprises a first power tap 140₁ which receives an optical signal $ML_1$ via the first optical distribution network 130. The first power tap 140₁ splits the received optical signal $ML_1$ into a plurality of reduced power optical signals, illustratively two signals denoted as S1 and S2. While the first power tap 140₁ is shown as splitting an input signal into two output signals, it will be appreciated by those skilled in the art that the first power tap 1401 (like all the other power taps described in this disclosure) may be adapted to generate more than two reduced power optical signal outputs. The first reduced power optical signal S1 is coupled to a receiver 150, which operates to demodulate and otherwise extract a first modulated data stream DATA'. The second reduced power optical signal $S_2$ is coupled to a modulator 160, which operates in a known manner to modulate a second data stream $DATA_2$ onto the reduced power optical signal $S_2$ to produce a modulated light signal $ML_2$. The modulated light signal $ML_2$ is coupled to a second power tap 140$_2$ via a second optical distribution network 170.

The second power tap 140$_2$ splits the received modulated light signal $ML_2$ into a plurality of reduced power optical signals, illustratively two signals denoted as $S_3$ and $S_4$. The third reduced power optical signal $S_3$ is coupled to a second receiver 180, which operates in a known manner to demodulate and otherwise extract the second data stream $DATA_2'$. The fourth reduced power optical signal $S_4$ is coupled to a modulator 165.

The modulator 165 operates to modulate a third data stream $DATA_3$ onto the fourth reduced power optical signal $S_4$ to produce a third modulated light signal $ML_3$. The third modulated light signal $ML_3$ is coupled to a third receiver 185 via a third distribution network 175. The third receiver 185 operates in a known manner to demodulate and otherwise recover the third data signal $DATA_3'$.

The apparatus 300 of FIG. 3 provides for cascade stages or cascade remodulation according to the invention. Constraints placed upon second data stream $DATA_2$ with respect to the first data stream $DATA_1$ so applied to the third data stream $DATA_3$. Moreover, the data rate of the third data stream $DATA_3$ should be less than one half the data rate of the second data stream $DATA_2$. It will be appreciated that the number of cascade stages is limited by the power of the received optical signal $ML_1$ and the power to propagate the remodulated optical signals $ML_2$ and $ML_3$. Additional stages (not shown) may be added.

The second receiver 180 and third receiver 185 include bandwidth limiting filters such as described above with respect to the system 100 of FIG. 1. Specifically, in a preferred embodiment, second receiver 180 includes a low pass filter adapted to pass those frequencies associated with the modulated second data stream $DATA_2$, while third receiver 185 includes a low pass filter adapted to pass those frequencies associated with the third modulate data stream $DATA_3$.

The system 100 of FIG. 1 described above may use either or both of the apparatus 200 of FIG. 2 and the apparatus 300 of FIG. 3. That is, the system 100 of FIG. 1 may advantageously employ the parallel processing techniques discussed above with respect to FIG. 2 or the cascade processing techniques discussed above with respect to FIG. 3. In any event, it is preferable to use modulation techniques adapted to reducing the length of consecutive "mark" or "space" bits to relatively low or specified lengths (e.g., Manchester encoding) and to insure that the data rate of a data stream to be remodulated is preferably one half or less than the data rate of the lowest existing data rate of a data stream presently modulated on the optical signal.

Figure 4:
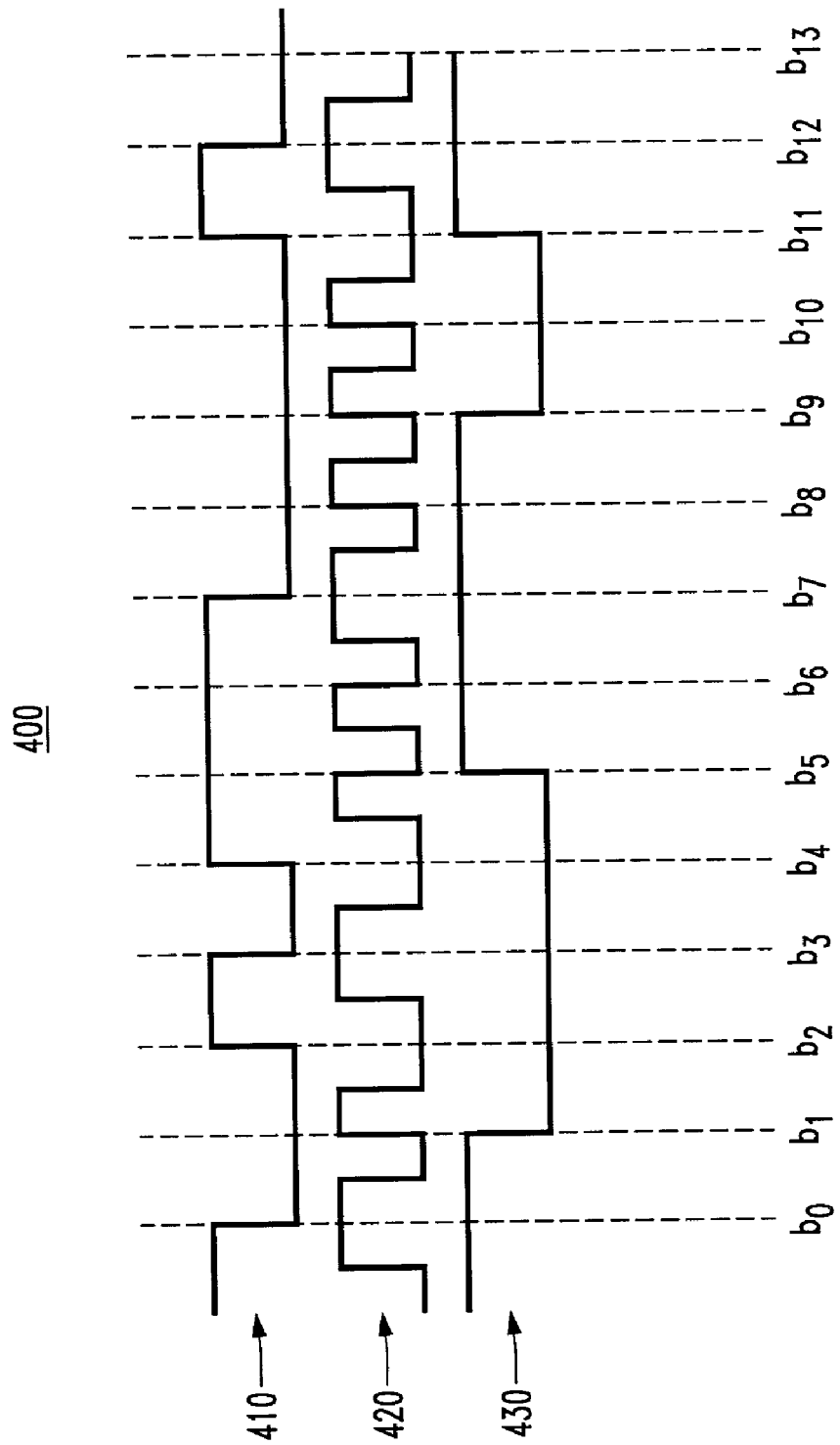
FIG. 4 depicts a timing diagram useful in understanding the present invention.

FIG. 4 depicts a timing diagram useful in understanding the present invention. Specifically, FIG. 4 depicts a timing diagram depicting a first data stream 410, a Manchester-encoded version 420 of the first data stream 410, and a second data stream 430. It will be noted that the data rate of the second data stream 430 is approximately half the data rate of the first data stream 410. The first data stream 410 is encoded using a non-return to zero (NRZ) bit pattern.

Figure 5:
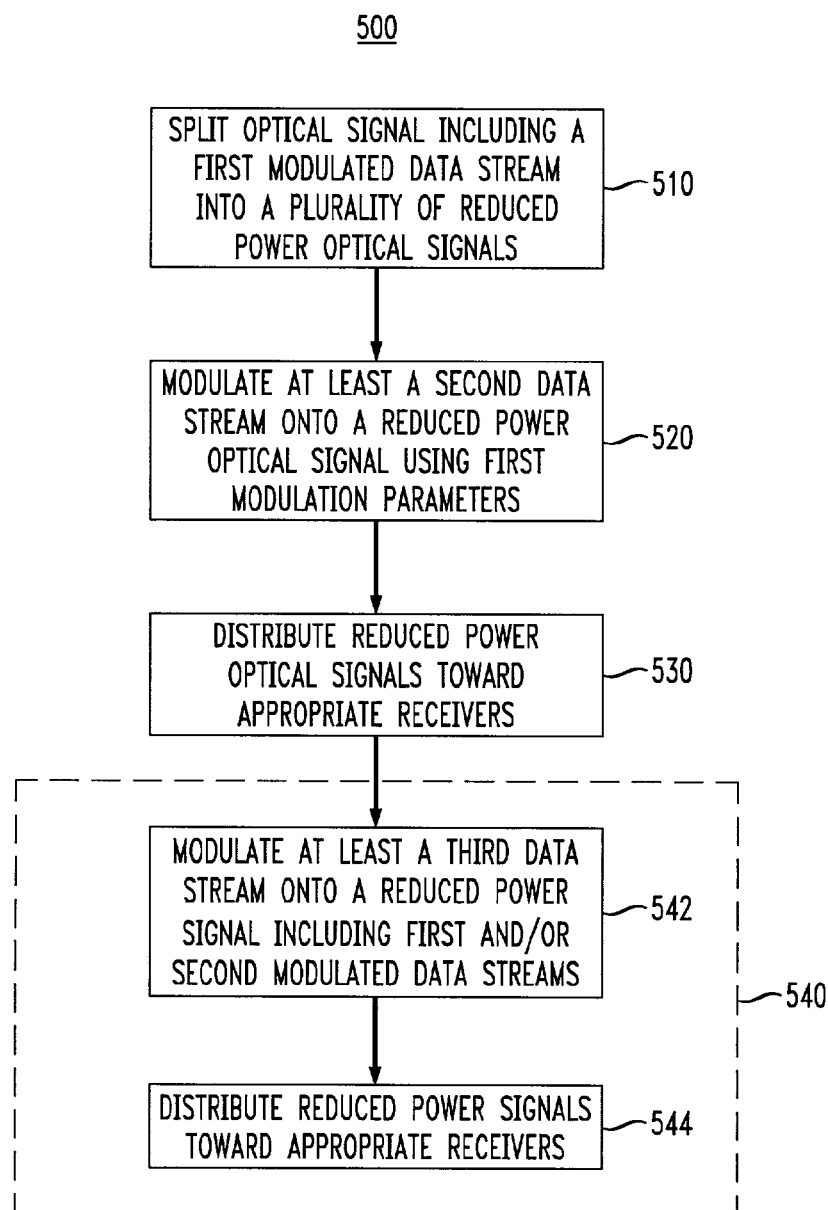
FIG. 5 depicts a flow diagram of a method according to an embodiment of the invention.

FIG. 5 depicts a flow diagram of a method 500 for processing an optical signal having modulated thereon a data stream such that a remodulated optical signal including a second data stream is produced.

At step 510, an optical signal including a first modulated data stream is split into a plurality of reduced power optical signals.

At step 520, at least a second data stream is modulated onto at least one of the reduced power optical signals using parameters associated with the first modulated data signal. For example, in one embodiment of the invention, the second data stream is constrained to a data rate not to exceed one half of the data rate of the first data signal.

At step 530, the reduced power optical signals are distributed towards appropriate receivers. For example, a reduced power optical signal including only the first data stream may be distributed toward a receiver intended to recover only the first data stream. Similarly, a reduced power optical signal including the first and second data streams may be distributed toward a receiver intended to recover the second data stream.

At step 540, optional additional processing is performed on reduced power optical signals including the first and/or second modulated data streams. Specifically, at step 542, a third data stream is modulated onto the reduced power optical signal including the first data stream and/or the second data stream. At step 544, the reduced power optical signal including the third data stream is distributed toward an appropriate receiver. It is noted that the data rate of the third data stream is constrained, in a preferred embodiment, to be one half (or less) than the lowest data rate stream presently modulated onto the reduced power optical signal being processed.

Figure 6:
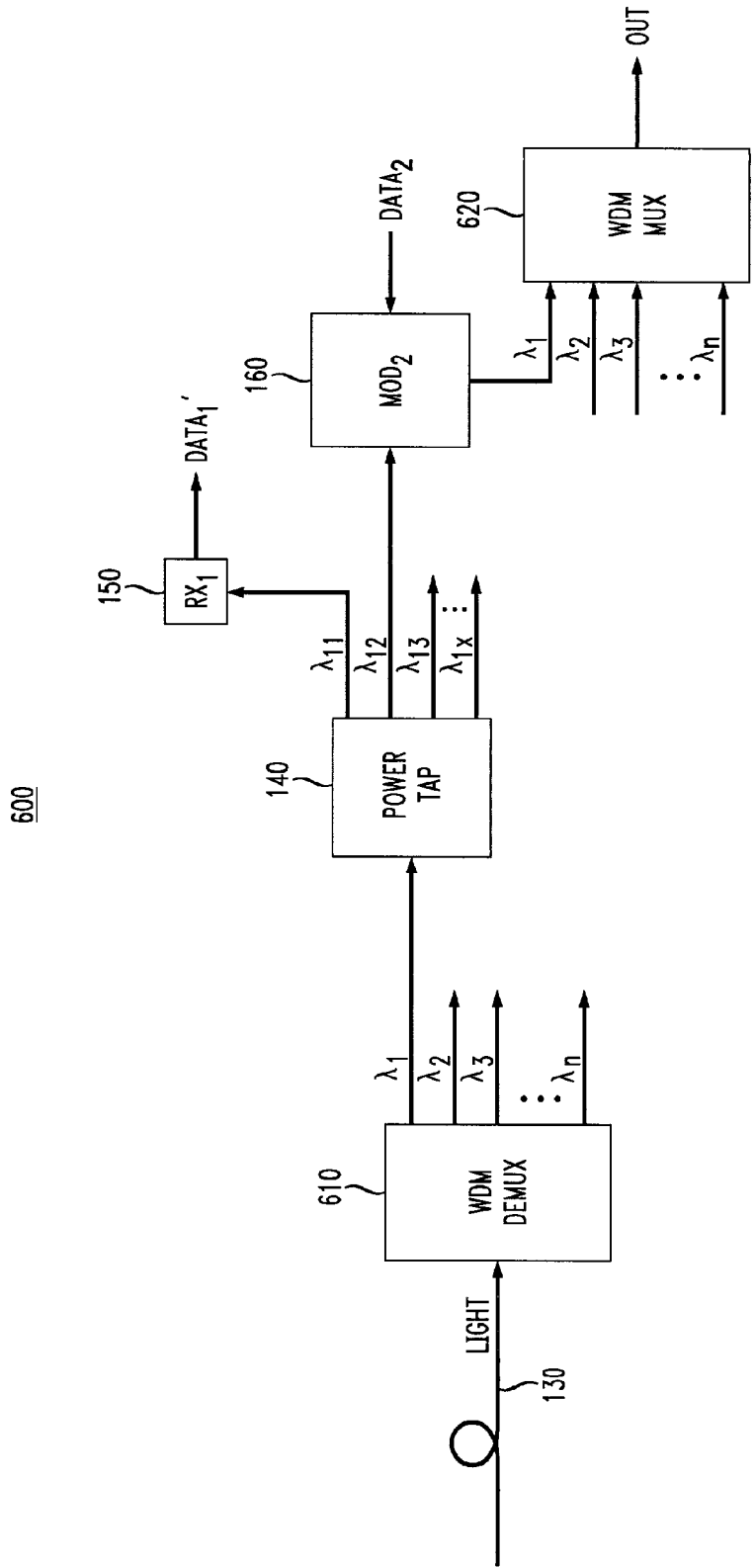
FIG. 6 depicts a high level block diagram of a wave division multiplexing (WDM) apparatus suitable for use within the systems and apparatus of FIGS. 1–3.

FIG. 6 depicts a high level block diagram of a wave division multiplexing (WDM) apparatus suitable for use within the systems of FIG. 1, and within the apparatus of FIGS. 2 and 3. The apparatus 600 of FIG. 6 may be used to replace portions of the above-described systems and/or apparatus where WDM processing techniques are employed.

A WDM demultiplexer 610 is operatively coupled to, for example, the first distribution network 130 for receiving wavelength division multiplexed optical signals wherein at least one of the WDM channels so conveyed is processed according to the invention. The WDM demultiplexer 610 processes a WDM encoded optical signal LIGHT to retrieve a plurality of WDM channels denoted as $\lambda_1$ through $\lambda_n$. A first WDM channel $\lambda_1$ is coupled to a power tap 140, which splits the first WDM channel $\lambda_1$ into a plurality of reduced power optical signals denoted as $\lambda 1_{11}$ through $\lambda_{1x}$. A first reduced power optical signal (e.g., $\lambda_{11}$) is coupled to a receiver 150 which operates in a known manner to demodulate and otherwise extract a first data stream $DATA_1'$. That is, the first WDM channel $\lambda_1$ of the WDM signal light received via the first distribution network 130 had modulated thereon a first data signal $DATA_1$ in a manner similar to that described above with respect to FIGS. 1–3.

The apparatus 600 of FIG. 6 may be used to replace portions of the above-described systems and/or apparatus where WDM processing techniques are employed.

A second reduced power optical signal (e.g., $\lambda_{12}$) is coupled to a modulator 160 which operates to modulate a second data stream $DATA_2$ onto the reduced power optical signal $\lambda_{12}$ using, preferably, an intensity modulation technique. The data constraints placed upon the second data signal $DATA_2$ with respect to the first data signal $DATA_1$ previously discussed are utilized within the apparatus 600 of FIG. 6 also. The modulator 160 produces at an output optical signal $\lambda_1'$ including modulated first data DATA$_1$ and modulated second data DATA$_2$ signals. The remodulated optical signal $\lambda_1'$ and the remaining WD channel signals $\lambda_2$ through $\lambda_N$ are remultiplexed by a WDM multiplexer 620 to form an output signal OUT suitable for transport via an optical distribution network (not shown).

It will be appreciated that more than one of the WDM channels $\lambda_1$ through $\lambda_N$ may be processed according to the invention. Further, it will be appreciated that more than one of the reduced power optical signals $\lambda_{11}$ through $\lambda_{1x}$ may be processed according to the invention. Finally, the parallel processing techniques discussed above with respect to FIG. 2, and the cascade processing techniques discussed above with respect to FIG. 3 may be employed within the context of the WDM system 600 of FIG. 6. Any or all of these processing techniques may in turn be employed within the system 100 of FIG. 1 or the system 700 of FIG. 7.

Figure 7:
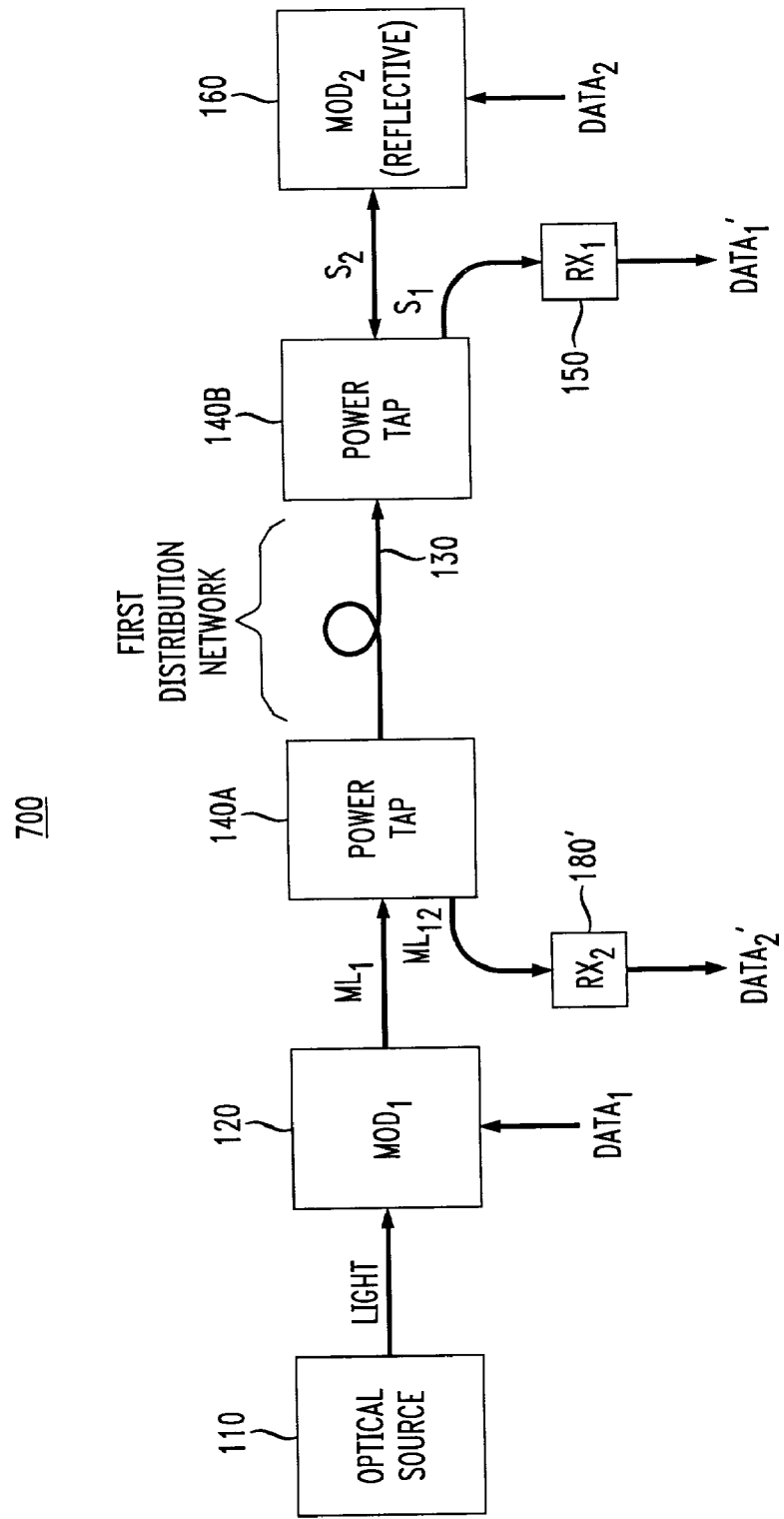
FIG. 7 depicts a high level block diagram of a system benefiting from the present invention.

FIG. 7 depicts a high level block diagram of a system benefiting from the present invention. Specifically, FIG. 7 depicts a high level block diagram of a data transmission system 700 comprising an optical source 110, a first modulator 120, a first power tap 140A, a second power tap 140B, a first distribution network 130, a first receiver 150, a second modulator 160 and a second receiver 180'.

It will be noted that some of the functional elements described herein with respect to the system 700 of FIG. 7 operate in substantially the same way as similarly designated functional elements of the system 100 of FIG. 1. As such, only the differences between the operation of the two systems 100 and 700 will be described in detail. The major difference between the systems 700 of FIG. 7 and 100 of FIG. 1 is the use of a reflective modulator as the second modulator 160, and the use of an additional power tap to receive a light signal having a plurality of data streams modulated thereon.

The modulated light signal ML$_1$ produced by the first modulator 120 is coupled to an input of the first power tap 140A. The first distribution network 130 provides an optical link between the first power tap 140A and the second power tap 140B. At the output of the second power tap 140B, the second reduced power optical signal S$_2$ is coupled to the second modulator 160. The second modulator 160 operates as a reflective modulator to modulate the second data stream DATA$_2$ onto the reduced power optical signal S$_2$ and reflect the resulting signal back into the optical transmission media via the same medium used to transport the reduced power optical signal S$_2$. A modulated light stream including the second data stream DATA$_2$ is propagated via the second power tap 140B, the first distribution network 130 and the first power tap 140A to the second receiver 180'. The second receiver 180' operates in a standard manner to recover the second data stream DATA$_2'$ from a light signal ML$_{12}$ including modulated thereon both the first data stream DATA$_1$ and the second data stream DATA$_2$.

The system 700 of FIG. 7 advantageously employs an existing light signal LIGHT provided by a single optical source 110 to carry a plurality of data streams. It is noted that the relationship between the first data stream DATA$_1$ and second data stream DATA$_2$ is described above in more detail with respect to FIGS. 1 through 6. Moreover, it is noted that the wave division multiplexing (WDM) techniques described above with respect to FIG. 6, as well as the system adaptations described above with respect to FIGS. 2 and 3, the method of FIG. 5, the encoding technique of FIG. 4 and other modifications previously described with respect to the system 100 of FIG. 1 are also applicable to the system 700 of FIG. 7.

In one embodiment of the invention, the functional element denoted as power tap 140A is instead implemented as an optical circulator 140A. It will be appreciated by those skilled in the art that optical circulators may be used to replace power tap 140B of the system 700 of FIG. 7. Additionally, power taps previously discussed with respect to FIGS. 1–6 may also be functionally replaced using optical circulators. More generically, any device capable of splitting an optical signal into a plurality of reduced power optical signals may be employed to implement the "power tap" or optical circulator function described with respect to the various figures.

Receivers adapted to utilize remodulated optical signals in accordance with the various embodiments of the invention include filtering means adapted to pass spectral region(s) associated with desired modulated data streams. It is noted that multiple bandpass filters may be employed to selectively pass respective data stream spectral regions such that a receiver may recover multiple data streams. In preferred embodiments, low pass filtering is used to selectively pass desired lower bit rate modulated data streams and discriminate against initial higher bit rate modulated data streams. Other modifications to the receivers discussed above may be made by those skilled in the art informed by the teachings of the present invention.

Although various embodiments which incorporate the teachings of the present invention have been shown and described in detail herein, those skilled in the art can readily devise many other varied embodiments that still incorporate these teachings.

The invention claimed is:

1. Apparatus, comprising:
   a first power tap, for receiving an optical signal having modulated thereon a first data stream, said first data stream having associated with it a first data rate;
   a second power tap, in communication with said first power tap via an optical medium, for splitting said optical signal having modulated thereon said first data stream into a plurality of reduced power optical signals;
   a reflective modulator, for remodulating at least one of said reduced power optical signals according to a second data stream and conveying said remodulated reduced power optical signal back to said first power tap via said optical medium, said second data rate being less than said first data rate;
   said first power tap splitting said remodulated optical signal into a plurality of reduced power remodulated optical signals, each of said reduced power remodulated optical signals being suitable for processing by a receiver to extract therefrom either said first or second data streams.

2. The apparatus of claim 1, wherein said optical signal having modulated thereon said first data stream comprises a channel within a wave length division multiplex (WDM) optical signal.

3. The apparatus of claim 1, wherein said second data rate is less than substantially one half of said first data rate.

4. The apparatus of claim 3, wherein said first data stream is Manchester encoded.

5. The apparatus of claim 1, wherein said first data stream includes one of 4B/5B encoding and 8B/10B encoding.

6. The apparatus of claim 1, wherein said first optical splitting device comprises a power tap.

7. The apparatus of claim 1, wherein said first optical splitting device comprises an optical circulator.

8. The apparatus of claim 1, further comprising a receiver having a filter adapted to pass those frequencies associated with a desired modulated data stream.

* * * * *